(12) United States Patent
Kennedy et al.

(10) Patent No.: US 10,693,651 B1
(45) Date of Patent: Jun. 23, 2020

(54) SYSTEM AND METHOD FOR AUTHENTICATION USING BIOMETRIC HASH STRINGS

(71) Applicant: Sokken Corporation, Stevenson, WA (US)

(72) Inventors: Paola Kennedy, Raleigh, NC (US); James Kennedy, Raleigh, NC (US)

(73) Assignee: Sokken Corporation, Stevenson, WA (US)

( * ) Notice: Subject to any disclaimer, the term of this patent is extended or adjusted under 35 U.S.C. 154(b) by 0 days.

(21) Appl. No.: 16/513,645

(22) Filed: Jul. 16, 2019

(51) Int. Cl.
*H04L 9/32* (2006.01)
*H04L 9/06* (2006.01)

(52) U.S. Cl.
CPC .......... *H04L 9/3231* (2013.01); *H04L 9/0643* (2013.01)

(58) Field of Classification Search
CPC ..... H04L 9/3231; H04L 9/0643; H04L 63/08; G06F 21/32
See application file for complete search history.

(56) References Cited

U.S. PATENT DOCUMENTS

| | | | |
|---|---|---|---|
| 7,024,562 B1* | 4/2006 | Flink | H04L 9/3231 713/176 |
| 8,312,290 B2* | 11/2012 | Chiou | H04L 9/3231 380/44 |
| 2003/0091218 A1* | 5/2003 | Hamid | G06K 9/00067 382/124 |
| 2017/0185761 A1* | 6/2017 | Stanwood | G06F 21/32 |
| 2018/0069854 A1* | 3/2018 | Chakraborty | H04L 63/0861 |
| 2019/0208076 A1* | 7/2019 | Berman | G06F 21/32 |

* cited by examiner

*Primary Examiner* — Shanto Abedin
(74) *Attorney, Agent, or Firm* — Christopher Mayle; John D. Houvener; Bold IP, PLLC (57) ABSTRACT

A process for completing transactions using biometric data, including include possible redundancies to ensure the accuracy of the transaction, and the system needed to perform the process. The process entails obtaining a biometric sample, extracting a biometric hash string from the biometric sample, converting the biometric hash string into an alpha numeric device, using the alpha numeric device to convey an identity, and equating the alpha numeric device to an identity with an account or membership.

20 Claims, 5 Drawing Sheets

SYSTEM AND METHOD FOR AUTHENTICATION USING BIOMETRIC HASH STRINGS

FIELD OF THE DISCLOSURE

This disclosure relates to the field of authentication using biometric information. More particularly, this disclosure relates to a system and process for converting biometric hash strings into alpha numeric devices that may be used to associate or represent identities, accounts, and memberships.

BACKGROUND

Traditional payment methods such as credit cards, debit cards, and cash are still the most popular methods for transactions. Most bank cards are made of polyvinyl chloride (PVC) material, but because PVC is a known carcinogen attributed with causing cancer from inhalation, and further, another disadvantage is that it is not typically recycled by the curbside recycling companies. Also, because of the important identifying information located on each card, including name, number, expiration date, and security code, consumers usually will shred or cut the card to prevent stolen data from falling into the wrong hands. However, many cities will only recycle cards if they are still whole because they require a certain process to be recycled. This means that most cards will be grouped with common trash and since PVC is toxic when incinerated and can lead to the destruction of the atmosphere, most cards eventually end up in a landfill or other waste deposit. Other forms of identification such as voter ballots, membership cards, account statements, passports, licenses, visitor logs may also end going through a similar process and find their way to a landfill.

Landfills are a temporary solution and the amount of waste put into a landfill can lead to dangerous toxins leaching into the soil and groundwater, thus becoming environmental hazards for years to come. Liquids are also formed when waste breaks down in a landfill and water filters through that waste. This liquid can be highly toxic and pollute the land, ground water, and water ways. Because of the importance of these forms of identification or payment processing and the relatively small footprint of a single credit card has led to people not to be concerned with the effects of the waste, many people still use these conventional forms of identification and payment, but as climate change and the negative effects on the environment are growing, the amount of waste caused by such conventional forms of identification is becoming a concerning problem.

In order to have these items continue to serve their purpose without the detriment that they cause to the planet, there must be an advancement to the medium of these items to something that is both non-disposable and universally applicable to everyone. An alternative to using conventional forms of identification and credit cards is provided in the form of biometric technology which is specific to and created from everyone's unique genetic material.

Biometric technology has proven quite useful for authentication of identification of one or more individuals and has been utilized anywhere from government organizations, banks, financial institutions, as well as many other high security areas. Since biometric characteristics cannot be easily stolen and are unique to each individual, biometric authentications processes should also provide a superior level of security than usual means of authentication such as transactional cards or physical currency. Biometric data is also less likely to undergo serious alteration or change as opposed to conventional methods. However, the receiving and analyzing of biometric data for normal transactions is a long process and impractical for businesses to implement. Thus, there still exists a need for completing transactions using biometric data in an easier and more accessible manner.

SUMMARY

The disclosure presented herein relates to a biometric authorization system, comprising: one or more databases coupled via a network, one or more processors coupled to the one or more databases; and at least one computing device coupled to the one or more processors and the one or more databases via the network; wherein the one or more processors are configured to, extract one or more features of a biometric sample corresponding to a body of a user, encode the features of the biometric sample as a biometric hash string, convert biometric hash string into an alpha numeric device, wherein the alpha numeric device is configured to act as an authorization code for an identity by an institution, encrypt the biometric hash string, store the encrypted biometric hash strings into batches corresponding to each identified connection, decrypt the biometric hash string before conversion into the alpha numeric device, encrypting the alpha numeric device, store the encrypted alpha numeric devices into batches corresponding to each identified connection, store the received encrypted alpha numeric device into a batch corresponding with an identified connection, decrypt the alpha numeric device, generate a packet configured for transmission to at least one institution, the packet comprising the alpha numeric device, wherein the packet further comprises one or more tags, wherein the tags have a timestamp of the time of creation of the biological sample corresponding to the user, verify the biometric hash string are within a predetermined threshold of a previously inputted biometric hash string, wherein the previously inputted biometric hash string equated with the identity of the user, validate said accessing of the identity by the user and to present confirmation through a display of the one or more computing devices.

The disclosure presented herein relates to a biometric authorization system comprising, one or more databases coupled via a network, one or more processors coupled to the one or more databases, and at least one computing device coupled to the one or more processors and the one or more databases via the network; wherein the one or more processors are configured to extract one or more features of a biometric sample corresponding to a user, encode the features of the biometric sample as a biometric hash string, convert biometric hash string into an alpha numeric device, the alpha numeric device configured to act as an authorization code for granting access to a user to an institution, generate a packet configured for transmission to at least one institution, wherein the packet comprises the alpha numeric device, send the packet to the at least one institution; validate said accessing of the identity by the user and to present confirmation through a display of the one or more computing devices, determine a current value at a second stage of biometric authorization system, the second stage being when biometric hash string is being converted into alpha numeric device, determine a starting value at a first stage of biometric authorization system; and feed back the current value calculated at the second stage into the first stage, for use in calculating an intermediate value, wherein the intermediate value is the difference between the starting value and current value within a predetermined threshold, determine a current value at a third stage of biometric authorization system, the third stage being when the packet is generated for transmission to the at least one institution, determine a starting value at a first stage of biometric authorization system, feed back the current value calculated at the third stage into the first stage, for use in calculating an intermediate value, the intermediate value being the difference between the starting value and current value within a predetermined threshold, determine a current value at a fourth stage of biometric authorization system, the fourth stage being when the packet is transmitted to the at least one institution, determine a starting value at a first stage of biometric authorization system, feedback the current value calculated at the second stage into the first stage, for use in calculating an intermediate value, the intermediate value being the difference between the starting value and the current value within a predetermined threshold, verify the biometric hash string are within a predetermined threshold of a previously inputted biometric hash string, wherein the previously inputted biometric hash string equates with the identity of the user.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises", and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for an improved system and method for converting biometric hash strings into alpha numeric devices that may represent identities, accounts, and memberships with sub-processes to ensure accuracy of the information and transmission. In one non-limiting embodiment, the process begins with collecting biometric samples and converting the biometric samples into biometric hash strings. The biometric hash strings are converted into alpha numeric devices. The alpha numeric devices are then provided to an institution. The institution uses the alpha numeric devices to authorize the provider of the biometric sample to perform tasks, follow instructions, or make transactions. The process ends with the authorization and/or instructions sent back to the source of the biometric sample or returned through the process to ensure accuracy of the returning authorization and/or instruction.

Within the process, there may be at least three opportunities where a subprocess may be used to verify the integrity of the biometric hash strings, the alpha numeric device, or the returning authorization and/or instructions. The first opportunity is when the biometric hash string is being converted into the alpha numeric device. The second opportunity is when the alpha numeric device is packeted for communication with an institution. The third opportunity is when the alpha numeric device is sent to the institution as a packet. With each of these opportunities is the option to skip a confirmation of the data and forward the verification to the next step in the system.

Figure 1:
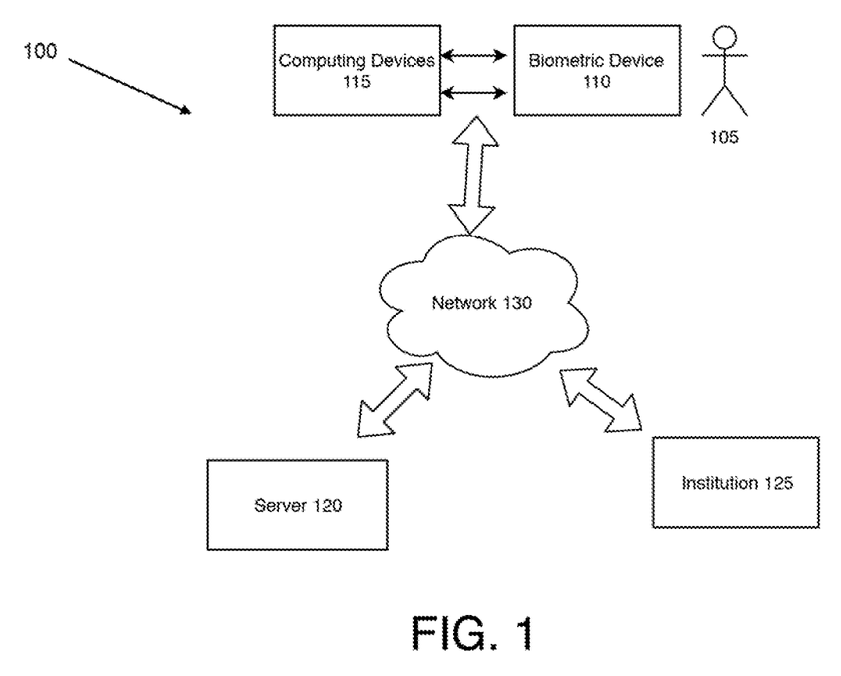
FIG. 1 shows a block diagram of biometric authentication system

With reference now to FIG. 1, FIG. 1 illustrates a block diagram of one exemplary embodiment of the biometric authentication system 100. In one or more non-limiting embodiments, biometric authentication system 100 may be innate, built into, or otherwise integrated into existing platforms or systems such as a website, a third party program, Apple™ operating systems (e.g. iOS), Android™, Snapchat™, Instagram™, Facebook™, or any other platform. Biometric authentication system 100 may include one or more users such as user 105. User 105 may upload biological samples from their own human body through one or more biometric devices such as biometric device 110. The biological samples may include, but are not limited to, user 105's fingerprints, face, eyelashes, skin, and bodily fluids. Further, user 105 may be enabled to upload data related to his or her voice patterns, images of his or her iris or the eyes as a whole, teeth structure, or any other type of feature associated with user 105's body may be used as a biological sample. More examples of biometric data that may be uploaded from user 105 include his or her vein patterns, heart rate, blood flow, and blood pressure.

Biometric device 110 may be any type of device having one or more sensors to capture the unique biometric samples of user 105. Biometric device 110 may have a plurality of mechanical or electrical systems and may be configured to digitize and convert the biometric samples into a biometric hash string. In one embodiment, biometric device 110 may be enabled to digitize and convert the biological sample into a biometric hash string on its own or may part of a series of components of biometric authentication system 100 implementing the necessary process. Biometric device(s) 110 may be in the form of any number of fingerprint sensors, digital cameras, heart rate monitors, blood pressure monitors, iris cameras, microphones, and DNA collecting systems, as well as any other devices used to capture biometric samples.

Biometric device 110 may generate biometric data by detecting (for example, measuring, deriving and/or the like) characteristics of biological or physiological features of user 105. The design and operation of biometric device 110 may be understood by those ordinary skill in the art. Biometric device 110 may vary based on the type and quality of the trait that biometric device 110 is configured to acquire from user 105. For example, an optical sensor may be used to scan a fingerprint or palm of user 105, whereby the optical sensor may be an example of biometric device 110. In another example, biometric device 110 may be in the form of a digital camera that may be used to capture facial images or certain aspects of the retina or iris of user 105. These sensors or cameras may generate a digital image of the biometric sample.

If biometric device 110 is a fingerprint sensor, the fingerprint sensor may have optical, capacitive, light emitting sensors, or multispectral approaches. Capacitive sensors may be configured to analyze the full range of the finger or a swipe of the finger such that when the finger ridges make contact the capacitive sensor detects electrical currents with the finger ridges. Optical sensors may use a prism, light source, and light sensor to capture images of fingerprints. In other non-limiting embodiments, biometric device 110 may use one or more sensors to identify vein patterns, and provide real-time measurements of heart rate, heart rate variability, blood flow, blood pressure, and any other biometrics. Biometric device 110 may have one or more infrared (IR) sensors utilizing a high dynamic range to allow for more detailed image capturing of the biometric samples provided by user 105.

Biometric device 110 may have real-time measurement(s) to authenticate that user 105 is actually user 105. For example, it may be necessary to verify if user 105 is alive and not deceased or that any body elements or parts that have been removed from user 105 and are currently being used as a biological sample are in fact associated with user 105. Biometric device 110 may be fabricated upon a flexible substrate to allow for better optical coupling with the part of user's 105 body that has the biometric sample of interest. In one or more non-limiting embodiments, biometric sensor may be directly attached to user 105's body or clothes.

Biometric device 110 may be an integral part of one or more computing devices such as computing device 115 shown in FIG. 1 or biometric device(s) 110 may be connected to computing device 115 through one or more wires. Alternatively, biometric device(s) 110 may be connected to computing devices 115 through a wireless connection via WI-FI, BLUETOOTH, a cellular connection over a cellular network, or via any other wireless communication network. As stated above, more than one biometric device 110 may be used to capture different types of biological samples. Alternatively, there may be a single biometric device 110 capable of capturing multiple types of biological samples.

Figure 2:
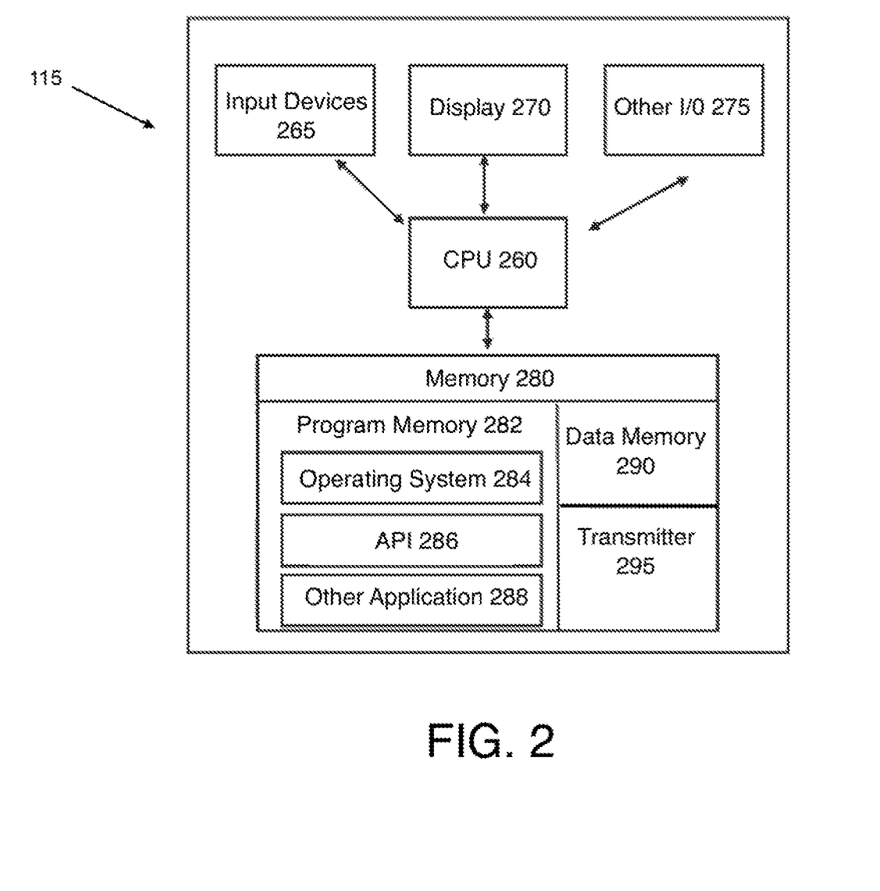
FIG. 2 shows an exemplary block diagram of various components of a computing device.

Turning to FIG. 2, FIG. 2 is a block diagram showing various components of computing device 115. Computing device 115 may comprise a housing for containing one or more hardware components that allow access to edit and query biometric authentication system 100. Computing device 115 may include one or more input devices such as input devices 265 that provide input to a CPU (processor) such as CPU 260 of actions related to user 105. Input devices 265 may be implemented as a keyboard, a touchscreen, a mouse, via voice activation, wearable input device, a camera a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of user computing device 115.

Computing device 115, may in some embodiments, be a computing device such as a merchant terminal device, dedicated register device, iPhone™, Android-based phone, or Windows-based phone, a tablet, television, desktop computer, laptop computer, gaming system, wearable device electronic glasses, networked router, networked switch, networked, bridge, or any computing device capable of executing instructions with sufficient processor power and memory capacity to perform operations of biometric authentication system 100 while in communication with network 130. Computing device 115 may have location tracking capabilities such as Mobile Location Determination System (MLDS) or Global Positioning System (GPS) whereby they may include one or more satellite radios capable of determining the geographical location of computing device.

Computing device 115 may have a transmitter 295, such as transmitter 295, to transmit the biometric sample or extracted biometric hash string. Transmitter 295 may have a wired or wireless connection and may comprise a multi-band cellular transmitter to connect to the server 120 over 2G/3G/4G cellular networks. Other embodiments may also utilize Near Field Communication (NFC), Bluetooth, or another method to communicate information.

Biometric device 110 may be in communication with one or more servers such as server 120, as illustrated in FIG. 1, via one or more networks such as network 130. Server 120 may be located at a data center or any other location suitable for providing service to network 130 whereby server 120 may be in one central location or in many different locations in multiple arrangements. Server 120 may comprise a database server such as MySQL® or Maria DB® server. Server 120 may have an attached data storage system storing software applications and data. Server 120 may receive requests and coordinates fulfillment of those requests through other servers.

Figure 3:
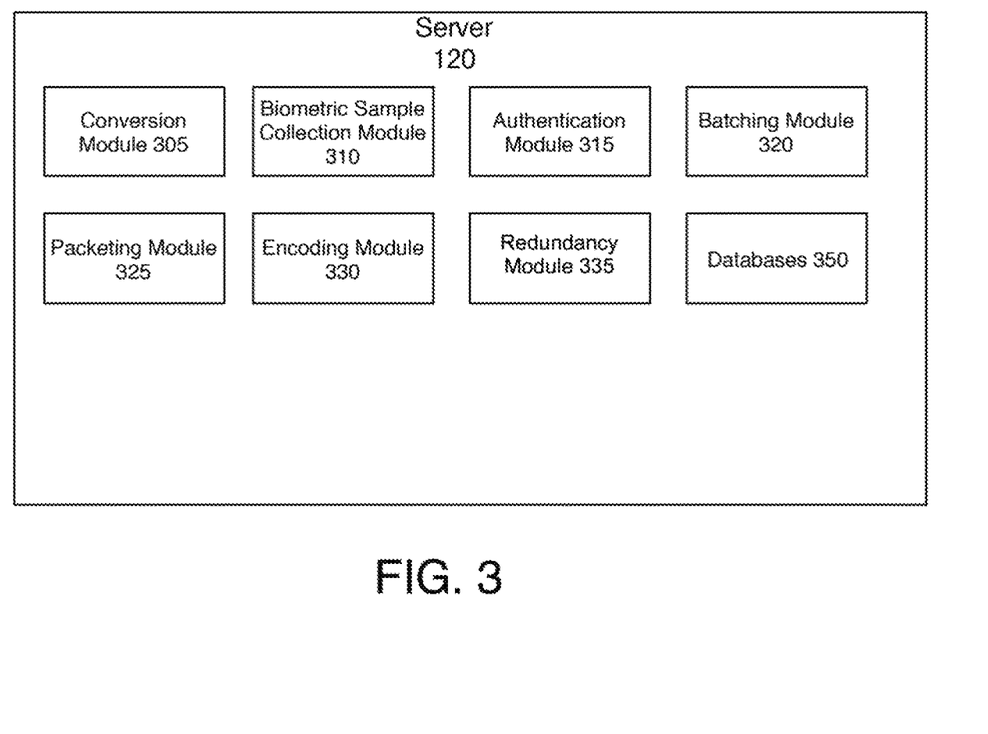
FIG. 3 shows a block diagram of the modules and databases of a server.

Turning to FIG. 3, FIG. 3 shows a block diagram of the modules and databases of a server. Server 120 may comprise a number of modules, as illustrated in FIG. 3. that provide various functions related to biometric identification system 100 using one or more computing devices. Modules may include one or more biometric sample collection modules such as conversion module 305, biometric sample collection module 310, authentication module 315, batching module 320, packeting module 325, encoding module 330, and redundancy module 335. Modules may be in the form of software or computer programs that interact with the operating system of server 120 whereby data collected in one or more databases such as databases 350 and may be processed by one or more processors within server 120 or biometric devices 110 or institution 125 as well as in conjunction with execution of one or more other computer programs. Software instructions for implementing the detailed functionality of the modules may be written in or natively understand. C, C++, Visual Basic, Java, Python, TCL, Perl, Scheme, Ruby, etc.

Databases 350 may provide storage space for one or more encryption keys, decryption keys, the biometric hash string, the alpha numeric device for further security enhancement. Databases 350 may operate as batch processing systems wherein biometric hash strings are inputted and outputted in batches from databases 350 rather than input from and output directly from biometric devices and institution. Batching module 320 may select biometric hash strings that are entered, and depending on the value of fields in the records, take some actions specified depending on the activity and identify of user 105. Batching module 320 may have an input component configured to read some input data, check the validity of that data, and to correct some errors, then queue the valid data for processing output.

Modules may be configured to receive commands or requests from biometric devices 110, computing devices 115, server 120, institution 125 and any other outside connected devices or components over network 130. Server 120 may comprise systems, subsystems, and modules to support one or more management services for biometric identification system 100. For instance, authentication module 315 may be configured to analyze biometric hash strings that make up an authentication pattern are within a predetermined threshold of biometric hash strings that user 105 has endorsed during the enrollment process. For example, in one embodiment, it may be possible for an entered biometric hash string to be compared with a matching template in database 350.

Redundancy module 335 may be configured to utilize a series of redundancy checks to ensure the integrity of the system. A redundancy check may be accomplished by determining a current value of the biometric hash string, alpha numeric device, data packet, or any other entity in biometric identification system, at a second stage and starting value at a first stage during the Biometric authentication system 100 wherein the second stage is at a point in time further in the process. Redundancy module 335 then feeds back the current value calculated at the second stage into the first stage by reversing the process. This may be done parallel to the normal process. When the current value is fed back through the system, an intermediate value is calculated, wherein the intermediate value is the difference between the starting value and current value within a predetermined threshold. This method of redundancy ensures multiple security checks are occurring concurrent with the normal process to provide enhanced security.

Institution 125, as shown in FIG. 1, may be connected to the one or biometric devices 110 and server 120. Institution 125 may be any sort of host, such as an electronic commerce business, an online merchant, a bank, a documenting agency, a financial institution, or any other type of service provider that may provide a service to a user. Further, institution 125 may include any institution, entity, club, organization, a corporation, individual, or other entity that keeps a database of biometric data and the associated metrics, accounts, permissions, transactions, instructions, coverages, services, or records of will. Institution 125 may perform an electronic transaction, such as a purchase of a product or service, such as online banking. Institution 125 may provide a centralized service utilizing biometric authentication system 100 to identify user accounts, identify suspicious activity from user 105 or one or more biometric devices 110 or server 120, track attempts by user 105, or associate an end-user account with one or more account numbers received from server 120 that were generated from biometric hash strings. Institution 125 may identify breaches in security or privacy to reduce the risk of fraud.

In one or more non-limiting embodiments institution 125 may operate as an acquiring bank (or its processor) configured to capture the transaction information and to routes the information through the appropriate card network to the cardholder's issuing bank to be approved or declined. In other non-limiting embodiments, institution 125 may operate as an issuing bank, which receives the transaction information from an acquiring bank and responds by approving or declining the transaction after checking to ensure, among other things, that the transaction information is valid, the cardholder has sufficient balance to make the purchase, and that the account is in good standing. Institution 125, in some embodiments, may also operate as an acquiring bank, issuing bank, a combination of both, or be connected or integrated.

Continuing with biometric authentication system 100, biometric device 110, computing devices 115, server 120, and institution 125 may all be communicatively connected to network 130. In one or more embodiments, network 130 may include a local area network (LAN), such as a company Intranet, a metropolitan area network (MAN), or a wide area network (WAN), such as the Internet or World Wide Web. Network 130 may be a private network or a public network, or a combination thereof. Network 130 may be any type of network known in the art, including telecommunications network, a wireless network (including Wi-Fi), and a wireline network. Network 130 may include mobile telephone networks utilizing any protocol or protocols used to communicate among mobile digital computing devices (e.g. computing device 104), such as GSM, GPRS, UMTS, AMPS, TDMA, or CDMA. In some embodiments, different type of data may be transmitted via network 110 via different protocols.

Network 130 may further include a system of terminals, gateways, and routers. Network may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if for instance they are in a remote location not accessible by other networks.

Figure 4:
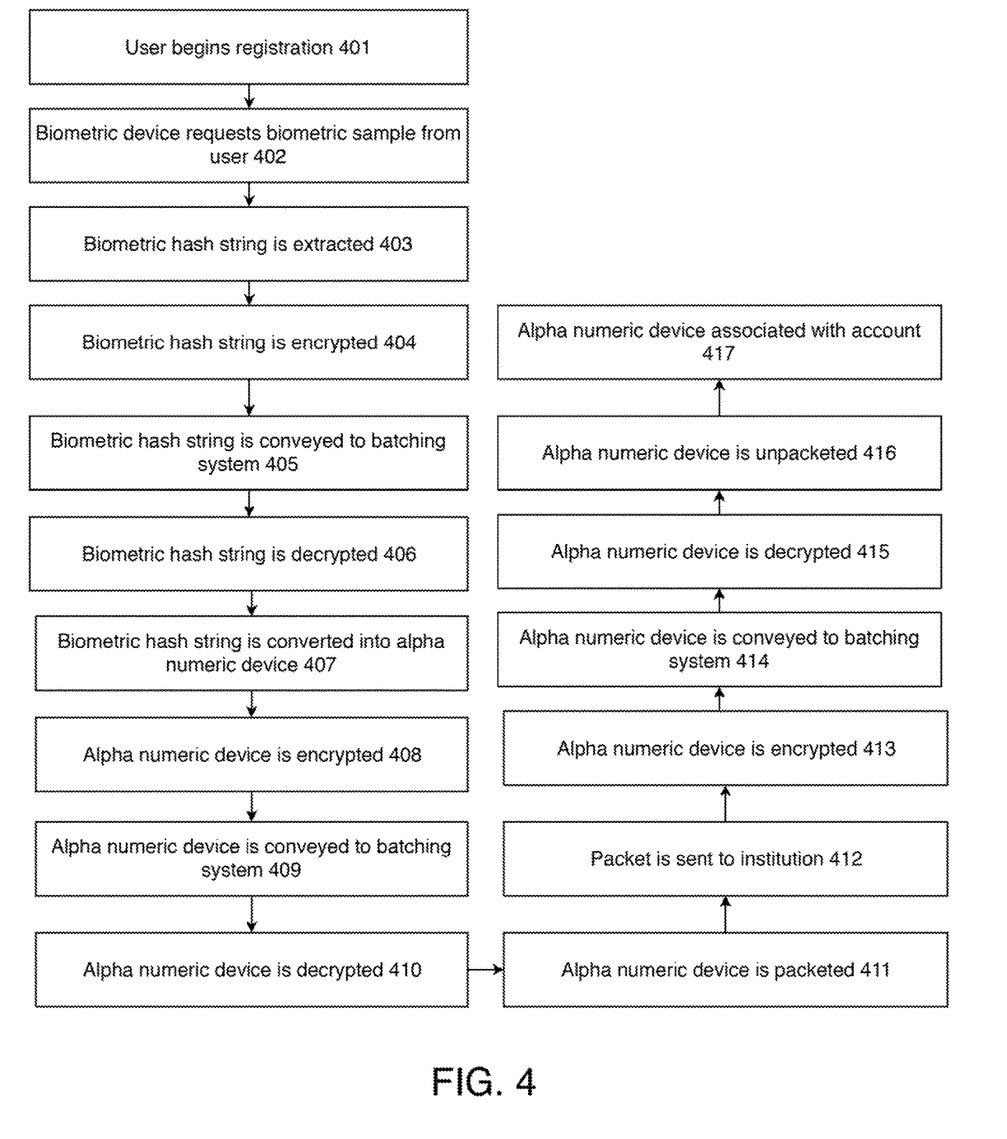
FIG. 4 shows a flowchart of an enrollment session of biometric authentication system.

FIG. 4 illustrates an exemplary method depicting a flow diagram showing an embodiment of an exemplary method for implementing an enrollment session of biometric identification system 100 using one or more components included in FIG. 1, such as, without limitation, biometric device 110, server 120, institution 125, and network 130.

At step 401, user 105 may initially register one or more biometric samples during an enrollment session to become a registered user associated with biometric authentication system 100 or any platforms which biometric identification system 100 has been integrated with biometric identification system 100. Once enrolled, any number of unique numbers or information may be assigned to a user with an enrolled biometric sample, such as, but not limited to a username, password, email account, phone number, fax number, mobile phone, browser IP address, account number, credit card number, CPU serial number, motherboard serial number, network card serial number, hard disk serial number, or a computer's direct IP address.

Upon initially signing up with biometric authentication system 100, user 105 may initiate an enrollment session through biometric device 110 or any other component connected to institution 125, whereby user 105 may be prompted to provide identifying information such as a unique ID, account number, or password, whereby the identifying information may be a series of alpha numeric characters or other characters of which user 105 wishes biometric sample to be associated with. After entering identifying information, user 105 may be presented with a text window interface on display 270 whereby user 105 may enter their name, username, password, phone number, address, account information, or any other information or preferences. User 105 may authorize biometric authentication system 100 to access information or other data from external sources such as a banking account to integrate banking account into biometric authentication system 100. Next in the exemplary process, biometric authentication system 100 may acquire the user's biometric sample.

In some non-limiting embodiments, user 105 may authorize biometric authentication system 100 to access information or other data from external sources having a collection of biometric samples of user 105. For example, biometric collection module 310, as shown in FIG. 3, may be configured to collect the biometric sample or already extracted biometric hash strings and integrate the biometric sample or biometric hash strings into biometric authentication system 100. In one or more non-limiting embodiments, user 105 may be required to provide credentials to the third-party service provider to allow access by biometric authentication system 100.

At step 402, display 270 of biometric device 110 may present to user 105 a prompt asking for one or more type of biometric samples. Biometric samples may include any element or part of user 105's body as needed, depending on the circumstances and the amount of security needed. For instance in one embodiment, biometric device 110 may be a fingerprint input transducer or sensor, whereby a finger is selected by user 105 and the finger is pressed against a flat surface, such as a plate made of glass or another transparent material, whereby the ridge and valley pattern of the fingertip of the finger is sensed by one or more sensors such as an interrogating light beam on biometric device 110.

In another embodiment, biometric device 110 may be a swipe fingerprint input transducer or sensor wherein user 105 drags their fingertip across the sensor. Biometric device 110 may take a scan of the user 105's fingerprint and the entire image may be pieced together by biometric sample collection module 310 and accumulating partial images as the fingertip moves across the scanning area.

At step 403, once biometric sample is collected by biometric collection module 310 from user 105 by biometric device 110, a biometric hash string may be extracted from the biometric sample. An exemplary method of biometric hash string extraction from a biometric sample that may be used in accordance with the presently disclosed inventive concepts may be found in U.S. Pat. No. 7,233,686 which is hereby incorporated herein by reference. Other methods for converting biometric samples to biometric hash tags or hashing algorithms include, but are not limited to, Message Digest (MDx) algorithms, such as MD4 and MD5, and Secure Hash Algorithms (SHA), such as SHA-1 and the SHA-2. In some non-limiting embodiments, biometric sample may be used to create multiple hash strings. For example, a finger print of a user 105 may be divided into three separate biometric hash strings wherein each biometric hash string then proceeds through the system in a similar process to a single biometric hash string. Biometric hash strings may be given a unique identifier identifying the biometric hash strings are a part of a set or family wherein biometric hash strings are either combined or individually identified and validated at a later point to authenticate user 105. Also, multiple biometric data sample sources may be used to create a single biometric hash string such as multiple parts of a user's 105 body providing thus enhancing security by requiring multiple forms of identification and preventing more fraudulent methods.

The biometric hash string may be used to map data of arbitrary size of the biometric sample onto data of a fixed quantifiable size such as a binary sequence to improve the speed and process of the biometric authentication system 100. Biometric hash string is preferably unique to user 105. Alternatively, it may have a high probability of uniqueness to user 105. Converting to a biometric hash string drastically reduces the time that it would take for an inputted biometric sample to be transmitted to an institution or be compared to an enrolled biometric sample. Another benefit is that biometric samples of any length may be calculated into short and fixed-length biometric hash values. Biometric hash strings may identify a position of any underlying features or traits collected from the body of the user. The pre-processing may also include orienting or aligning the received biometric sample.

For example, user 105's measured biometric sample may include one or more features such as ridges or valleys of a finger. The biometric hash string may then be based on these biometric features of user 105 (or based on the position of those features in the biometric sample). Moreover, a unique device string may be used to randomize the biometric sample prior to the encoding. The biometric hash string may also include information regarding the type of each underlying feature or trait collected. The biometric hash string is then uploaded to and registered with server 120. For example, the biometric sample is user 105's eyeball and may be collected by biometric collection module 310, in one embodiment, from a retinal scan wherein the central ridges and the locations and diameter of the optic nerve, iris, and pupil may act as the underlying features in creating a biometric hash string.

When a new biometric hash string is collected by biometric collection module 310 during the enrollment process, authentication module 315 may compare biometric hash string to existing entries. If there is no single match found on any biometric hash string currently stored on databases 350, authentication module 315 may establish a new biometric hash string in databases 350. The process may be repeated to create new biometric hash string whenever a new set of biometric hash string are extracted and collected from biometric samples. If the new biometric sample matches the existing entry, authentication module 315 labels the two sets of data as belonging to the same user 105.

If multiple biometric samples are collected of different values, multiple biometric hash strings may also be stored in databases 350. Then, when the biometric sample is collected during an authentication session, the resulting biometric hash string may be compared to each of the stored biometric hash string created during the enrollment session. If either matches then the inputted biometric hash string is authorized. If this occurs because some of the directions or orientations are close to an edge or perimeter of the biometric sample, then during the registration process, multiple biometric hash strings may be stored with the requirement that any stored biometric hash string must appear at least twice.

In one non-limiting embodiment, the biometric hash string may be combined with one or more cryptographic random data generated by the one or more processors of server 120 that is used as an additional input to provide further safeguards against brute force attacks and other attempts at bypassing the security measures of biometric authentication system 100. When biometric device 110 collects the biometric sample from user 105, a cryptographic random data may be integrated or otherwise attached to biometric hash string where the cryptographic random data is removed at a later stage of the process or identified as random data by biometric authentication system 100.

At step 404, encoding module 330 may then encrypt biometric hash string. Encoding module 330, shown in FIG. 3, may be configured to encrypt and decrypt biometric hash strings, making encryption and decryption autonomous in use. Encoding module 330 may preferably store the extracted hash string and any accompanying cryptogenic random data along with a definable hierarchy of encryption keys into databases 350 for batching purposes. Batching allows the biometric hash string to be traced back to a specific biometric hash string for retrieval and withdrawal of a biometric hash string when converted to an alpha numeric device. The hierarchy preferably forms a table wherein a private encryption key name and value associated with each biometric hash string in the table, wherein encoding module 330 may store both encryption keys and decryption keys as necessary for the selected cryptographic algorithms for encoding biometric hash strings.

Biometric hash string and an encryption key may be used as inputs to the encoding module 330. The resulting output of the encoding is ciphertext, which is an encrypted version of the hash string, as a corresponding output. In one embodiment, only a specific part of the biometric hash string may be encrypted. Encryption key preferably takes the form of multi-digit number of a certain complexity proving difficult to transcribe. The encryption key name is preferably an alpha numeric descriptor which may be used for encoding module 330 administering the encryption key value. The encryption key may be a public key or a symmetrical private key.

If a private encryption key is utilized, private encryption key may be associated with the biometric hash string. A unique encryption key value is then obtained associated with the alpha numeric device. Once encoding module 330 obtains the encryption key value, encoding module 330 then encrypts the biometric hash string with the encryption key value and stores the encrypted hash string into databases 350.

If a public encryption key is utilized, in one embodiment, one key value may be used for encryption and other individual decryption keys may be used for decryption. The biometric hash string may be associated with the public encryption key value obtained and then associated with an individual decryption key. Once encoding module 330 obtains the public encryption key value, encoding module 330 then encrypts the biometric hash string with the encryption key value and stores the encrypted biometric hash string into databases 350.

At step 405, batching module 320 may then access the encrypted biometric hash strings collected and form one or more batches containing the biometric hash string stored in databases 350. Biometric hash strings may be assigned to batches according to one or more defined connections so that biometric hash strings associated with the same connection may be assigned to the same batch. The connection may be pre-defined or the connection may be defined based on the received biometric hash strings. Accordingly, batching module 320 may determine that a received biometric hash string is associated with a defined connection. This may include connecting biometric hash strings that have similar communication protocol entities.

Batching module 320 may process each of the received biometric hash strings into a batch of data packets associated with the same defined connection as the received biometric hash string. This allows received biometric hash strings belonging to the same connection to be configured into the same batch such that further operations may be performed to batches of packets rather than single biometric hash strings. Number of batches may be determined by a memory space that is available on one or more database (such as databases 350) to store the batches. Accordingly, the memory space may limit the number of batches and the sizes of the batches. The size of the batch may be determined by the number of biometric hash strings in a batch.

At step 406, encoding module 330 may then decrypt biometric hash string in which encoding module 330 obtains a decryption key name which is associated with the biometric hash string. Encoding module 330 may then use the decryption key name to retrieve a decryption key value which is associated with the decryption key name. The decryption key value, in a similar manner to the encryption key value, is related to the biometric hash string of user 105, and this is accomplished by retrieving the decryption key value from the key table stored in databases 350.

In one or more non-limiting embodiments if encoding module 330 determines that encoding module 330 does not have access to decryption keys, encoding module 330 may determine if the decryption keys are available from an outside source or party such as an independent key release agent. In one embodiment, if a decryption key cannot be obtained for a biometric hash string, the biometric hash string may not be decrypted and further converted into a numerical quantity. Encoding module 330 may record that the hash string was not decrypted and present the error to the user through display of biometric device 110 or present information so that an operator may later check the biometric hash strings that were not decrypted to forge a possible solution.

In further non-limiting embodiments, biometric hash strings created during enrollment session may be encrypted and stored locally on biometric device 110 such that inputted biometric hash strings may have another level of validation before being sent to a server (such as server 120). Doing so allows feedback to be received immediately regarding whether the user did or did not generate an authentic biometric hash string. If this fails to match, the user may be immediately informed that the biometric sample did not validate and then asked to scan the biometric sample again via biometric device 110. In one or more non-limiting embodiments, biometric hash strings may be combined with a cryptographic random data stored on biometric device 110 before being uploaded to and registered with server 10

At step 407, biometric hash string may be converted from a binary sequence into an alpha numeric device having decimal sequence by conversion module 305 wherein the key indicators or traits of the biometric sample are converted from binary designated as Arabic numerals. The numerals may also be other symbols or languages such as but not limited to Cyrillic, Hebrew, Sino, Greek, or Hindi. Typically, the symbols {0, 1, 2, 3, 4, 5, 6, 7, 8, 9} may be used. Conversion Module 305 may operate on a binary coded decimal system and is configured to convert each binary coded block into a decimal. Binary coded decimal system may be a system of number representations in which each decimal digit is represented by a group of binary digits from the biometric hash string. The binary coded decimal system may range from a four position binary code 0000 to 1001 (decimal 1 to 9). Each decimal digit is therefore represented by four bits. A 1, 2, 4, or 8 bit code may be employed, however, it is noted that other codes, such as, but not limited to, the gray code may also be employed. Alternatively, hexadecimal systems symbols may be used ranging from 0000 to 1111 wherein the symbols {0, 1, 2, 3, 4, 5, 6, 7, 8, 9, A, B, C, D, E F} are used.

At step 408, the alpha numeric device may be encrypted. In one embodiment, encoding module 330 may encrypt the alpha numeric device. Further, in one embodiment, the alpha numeric device may be preferably stored along with any accompanying cryptogenic random data and a definable hierarchy of encryption keys into databases 350 for batching purposes in a similar manner to the process used for encrypting and batching of biometric hash strings. The definable hierarchy preferably forms a table whereby an encryption key name and value are associated with each biometric hash string in the table, whereby encoding module 330 may store both the encryption keys and the decryption keys as necessary for the selected cryptographic algorithms for encoding alpha numeric devices.

In one or more embodiments, an alpha numeric device and an encryption key may be used as inputs to encoding module 330. The resulting output of the encoding is ciphertext (i.e., an encrypted version of the biometric hash string) as a corresponding output. In one embodiment, only a specific part of the alpha numeric device may be encrypted. The encryption key name is preferably an alpha numeric descriptor which may be used by encoding module 330 for administering the encryption key value. The encryption key may be a public key or a symmetrical private key.

If a private encryption key is utilized, a private encryption key may be associated with the alpha numeric device and a unique encryption key value may be obtained from the private encryption key and be associated with the alpha numeric device. Once encoding module 330 obtains the encryption key value, encoding module 330 then encrypts the alpha numeric device with the encryption key value and stores the encrypted alpha numeric device into databases 350.

If a public encryption key is utilized, this public encryption key may be associated with the alpha numeric device. A public encryption key value may then be obtained from the public encryption key and then associated with the alpha numeric device. Once encoding module 330 obtains the public encryption key value, encoding module 330 then encrypts the alpha numeric device with the encryption key value and stores the encrypted alpha numeric device into databases 350.

At step 409, batching module 320 may access the encrypted alpha numeric devices and form one or more batches containing the alpha numeric devices that are stored in database 350. Alpha numeric devices may be assigned to batches according to one or more defined connections so that packets associated with the same connection may be assigned to the same batch. The connection may be predefined or they may be defined based on the received alpha numeric devices. Accordingly, batching module 320 may determine that a received biometric alpha numeric is associated with a defined connection. The information defining the connection may comprise information identifying the protocol entities communicating on the connection.

Batching module 320 may process each of the received alpha numeric devices into a batch of data packets associated with the same defined connection as the received biometric hash string. This allows received alpha numeric devices belonging to the same connection to be configured into the same batch such that further operations may be performed to batches of alpha numeric devices rather than single alpha numeric devices. Number of batches may be determined by the amount of memory space available on a database to store the batches. Accordingly, the memory space may limit the number of batches and the sizes of the batches. The size of the batch may be determined by the number of alpha numeric devices in a batch.

At step 410, alpha numeric device is then decrypted by encoding module 330 which then obtains a decryption key name which is associated with the alpha numeric device. Encoding module 330 then may use the decryption key name to retrieve a decryption key value which is associated with the decryption key name. The decryption key value, in a similar manner to the encryption key value, is related to the alpha numeric device associated with user, and this is accomplished by retrieving the decryption key value from the key table stored in databases 350.

In one or more non-limiting embodiments, if encoding module 330 determines that it does not have access to decryption keys, encoding module 330 may then determine if the decryption keys are available from an outside source or party such as an independent key release agent. If decryption key cannot be obtained for alpha numeric device, the alpha numeric device may not be decrypted and further converted into a numerical quantity. Encoding module 330 may record that the alpha numeric device was not decrypted and present the error to user through the display screen of biometric device 110 or present information so that an operator may later check the alpha numeric device that was not decrypted to forge a possible solution.

Biometric authentication system 100 may utilize a series of cyclic redundancy checks wherein a fixed number of check bits, known as checksum, are appended to the biometric hash string before being encrypted or alpha numeric device before being encrypted. Redundancy module 335 may receive biometric hash string or alpha numeric device and inspect the check bits for any errors. If it seems that an error has occurred, a negative acknowledgement is transmitted asking for data retransmission and process may be terminated or a system administrator may be notified.

At step 411, packeting module 325 may generate a data packet to be transmitted to institution 125 comprising alpha numeric device and one or more identifying operational tags. An exemplary method of sending an alpha numeric device in a packet to an institution 125 that may be used in accordance with the presently disclosed inventive concepts was created by Ori Eisen. An example of this method may be found in U.S. Pat. No. 9,948,629 which is hereby incorporated herein by reference.

Operational tags may include the information identifying operation, identification, or transaction of user 105. Operational tags may include a timestamp taken from the time of creation of the operational tag by packeting module 325. In some embodiments, time stamp may be embedded within the operational tag while in other embodiments timestamp may be independent of the tag. Operational tags may include a geographic stamp including a city, state/province, country, time zone, Internet Service Provider, or net speed. Additionally, an operational tag may also include the network type taken from the location of biometric device 110 whereby, in some embodiments, institution 125 may compare the geographic information with user's 105 self-entered geographic information for consistency. In other embodiments, institution 125 may not require operational tag or packeting module 325 may not generate a tag during the packeting process.

At step 412, packet generated from user 105 may be transmitted to institution 125 which may then collect any user or biometric device 110 information device during enrollment. At step 413, institution 125 may encrypt alpha numeric device as well as any additional operational tags that have been received by server 120. In some embodiments, institution 125 may further generate a device identifier in addition to the alpha numeric device that identifies each user. Using the alpha numeric device institution 125 may also detect fraudulent activities during the enrollment process.

At step 414, an alpha numeric device is conveyed to a batching system. Accordingly, batching module 320 may access the encrypted packets stored in database and form one or more batches containing alpha numeric device. Alpha numeric device may be assigned to batches according to one or more defined connections so that packets associated with the same connection may be assigned to the same batch. The connection may be pre-defined or they may be defined based on the received alpha numeric device.

Accordingly, batching module 320 may determine that a received biometric alpha numeric device is associated with a defined connection. This may include matching of information that identifies communicating protocol entities derived from the received alpha numeric device with information defining the connection. The information defining the connection may comprise information identifying the protocol entities communicating on the connection. Batching module 320 may process each of the received alpha numeric devices into a batch of data packets associated with the same defined connection as the received biometric hash string. This allows received alpha numeric devices belonging to the same connection to be configured into the same batch and further operations may be performed to batches of packets rather than single biometric hash strings. At step 415, institution 125 may decrypt alpha numeric device.

At step 416, for each packet in the batch, the alpha numeric device may be unpacketed. At step 417 the alpha numeric device may act as a private key used for a created association with an identity authentication for any associated account numbers of user 110. In other embodiments the alpha numeric device may act as identify authentication for a password, credit card, a bitcoin wallet, an encryption key for storage of certain data, an encryption key for permission to view sensitive information, and/or any other private or sensitive information sought to be protected or validated that is associated with user.

Institution 125 responds to receipt of user 105's alpha numeric device by storing the alpha numeric device as a record in a master key database associated with user 105's account. Upon successful enrollment a biometric sample of user 105 and successful authorization by institution 125, a receipt of user's account association with biometric sample may be presented by display 270 of biometric device 110, or email, or text, whereby biometric authentication system 100 has confirmed the biometric sample has been received and authorized so that when user 105 provides a biometric sample in the authentication session the biometric sample will be confirmed as a match as to the existing association between biometric sample and account obtained during the enrollment session.

Figure 5:
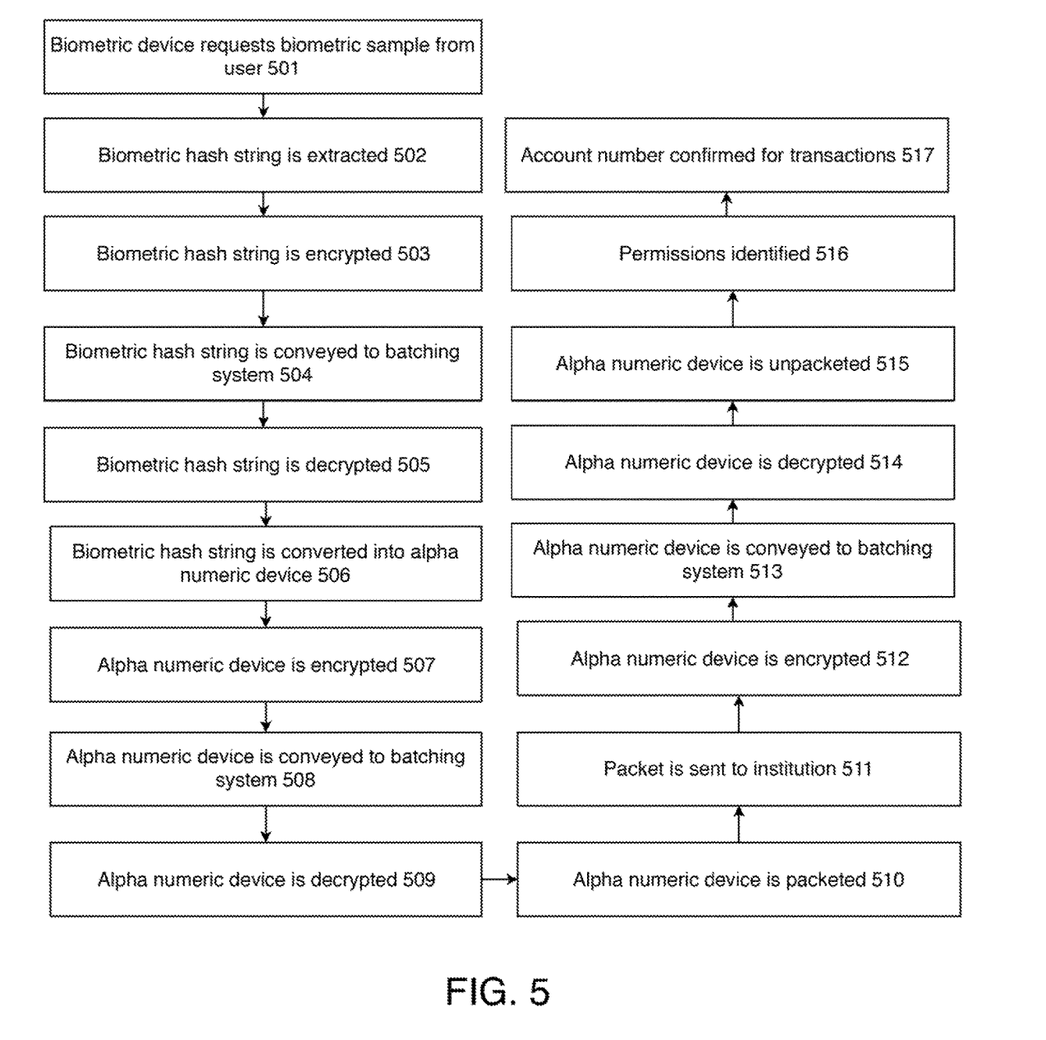
FIG. 5 shows a flowchart of an authentication session of biometric authentication system.

FIG. 5 illustrates an exemplary method depicting a flow diagram showing an exemplary method for implementing an authorization session of biometric identification system 100 when user 105 wishes to use biometric sample for authorization. The process for authorization may be similar to the method for an enrollment session as previously discussed. Display 270 of biometric device 110 may present to user 105 a prompt requesting for one or more type of biometric samples.

At step 501, biometric sample is collected from the body of user 105 by biometric device 110. At step 502, a biometric hash string may be extracted from the biometric sample. Biometric hash string may identify a position of any underlying features or traits collected from the body of user 105. The pre-processing may also include orienting or aligning the received biometric sample. The biometric hash string is then uploaded to and registered with server 120.

When a new biometric hash string is collected during the authorization process, authentication module 315 may compare hash string to existing entries. The biometric hash string may be combined with one or more cryptographic random data wherein the random data is random data generated by the one or more processors of server 120.

At step 503, encoding module 330 may encrypt biometric hash strings and store the extracted hash string, any accompanying cryptogenic random data along with definable hierarchy of encryption keys into database 350 for batching. Biometric hash string and an encryption key may be used as inputs to the encoding module 330. The resulting output of the encoding is ciphertext (i.e., an encrypted version of the biometric hash string) as a corresponding output. In one embodiment, only a specific part of the biometric hash string may be encrypted.

At step 504, batching module 320 may access the encrypted biometric hash strings collected and form or more batches containing the biometric hash strings. Batching module 320 may process each of the received biometric hash strings into a batch of data packets associated with the same defined connection as the received biometric hash string.

At step 505, biometric hash string is decrypted. Encoding module 330 may obtain a decryption key name which is associated with the biometric hash string. Encoding module 330 then may use the decryption key name to retrieve a decryption key value which is associated with the decryption key name. If encoding module 330 determines it does not have access to decryption keys, encoding module 330 may determine if the decryption keys are available from an outside source or party such as an independent key release agent. If decryption key cannot be obtained for the biometric hash string, the biometric hash string may not be decrypted and further converted into an alpha numeric device, thereby terminating the process. Encoding module 330 may record the biometric hash string was not decrypted and present the error to a user through display of biometric device 110 or present information so that an operator may later check the biometric hash strings that were not decrypted to forge a possible solution.

For verification after decryption of inputted biometric hash string received during authentication session, biometric hash string received during authentication session is compared to biometric hash string derived from the enrollment process of user 105 into biometric authentication system 100. Upon the result of the comparison, when decryption inputted biometric hash string is within a predetermined threshold such as but not limited to, equal or 99% equivalent, to the biometric hash string derived from the enrollment process such that there is a match between inputted biometric hash string and the biometric hash string derived from the enrollment process therefore, then the redundancy check is confirmed and inputted hash string is converted into an alpha numeric device.

If there are multiple biometric hash strings derived from the enrollment process, such as different kinds of biometric samples (e.g. blood, fingerprint) or variations of a single biometric sample is collected, matching module may determine if inputted biometric signature is equal to one or more of these biometric hash strings. This allows for provision of only a single biometric hash string extracted from a fingerprint being the correct match instead of requiring every possible biometric hash string collected to ensure authorization.

In the case where the inputted biometric hash string is anything other than equal to the biometric hash string derived from the enrollment process, this indicates that there is no match between inputted biometric hash string and the biometric hash string derived from the enrollment process, therefore, the process is terminated and user 105 may prompted to provide another subsequent biometric sample into biometric device 110.

In one or more non-limiting embodiments biometric hash string may only be required to reach a predetermined threshold level to be validated as a match. In one or more non-limiting embodiments, a "score" of 80% could be used as the trigger wherein at least 80% of the biometric hash string of the indicators or traits collected from the biometric sample match the biometric hash string stored during the enrollment session. In other embodiments the score may be a range such as 75% to 100% could be used as a trigger.

A timed lockout of a predetermined unit of time, such as thirty seconds or thirty minutes, or any other measurement of time, may be implemented after a predetermined number of attempts at inputting a biometric sample to prevent or intervene in case of the threat of brute force attacks by hackers or artificial intelligence. In other non-limiting embodiments, a timer may be set to prevent or slowdown the next attempt by user 105 to input a biometric sample during authentication session. With each failure, the timing may be increased by addition or multiplication.

At step 506, biometric hash string may be converted from a binary sequence into alpha numeric device having decimal sequence. At step 507, encoding module 330 then may encrypt the alpha numeric device and preferably store the alpha numeric device, and any accompanying cryptogenic random data along with definable hierarchy of encryption keys into databases 350 for batching purposes in a similar manner to encoding of biometric hash strings. The hierarchy preferably forms a table wherein an encryption key name and value associated with each biometric hash string in the table, whereby the encoding module 330 may store both encryption keys and decryption keys as necessary for the selected cryptographic algorithms for encoding biometric hash strings.

Alpha numeric device and an encryption key may be used as inputs to encoding module 330. The resulting output of the encoding is ciphertext (i.e., an encrypted version of the biometric hash string) as a corresponding output. In one embodiment, only a specific part of the alpha numeric device may be encrypted. Encryption key preferably takes the form of multi-digit number of a certain complexity proving difficult to transcribe. The encryption key name is preferably an alpha numeric descriptor which may be used by encoding module 330 for administering the encryption key value. The encryption key may be a public key or a symmetrical private key.

At step 508, batching module 320 may access the encrypted alpha numeric devices and form or more batches containing the alpha numeric devices and store the batches in databases 350. Alpha numeric devices may be assigned to batches according to one or more defined connections so that packets associated with the same connection may be assigned to the same batch. The connection may be pre-defined or they may be defined based on the received alpha numeric devices. Accordingly, batching module 320 may determine that a received biometric alpha numeric device is associated with a defined connection. This may include matching of information that identifies communicating protocol entities derived from the received alpha numeric device with information defining the connection.

The information defining the connection may comprise information identifying the protocol entities communicating on the connection. Batching module 320 may process each of the received alpha numeric devices into a batch of data packets associated with the same defined connection as the received biometric hash string.

At step 509, alpha numeric device then decrypted, in which encoding module 330 obtains a decryption key name which is associated with the alpha numeric device. Encoding module 330 then may use the decryption key name to retrieve a decryption key value which is associated with the decryption key name. The decryption key value, in a similar manner to the encryption key value, is related to the alpha numeric device associated with user 105, and this is accomplished by retrieving the decryption key value from the key table stored in databases 350.

In one or more non-limiting embodiments encoding module 330 may determine that encoding module 330 does not have access to decryption keys. Encoding module 330 then may determine if the decryption keys are available from an outside source or party such as an independent key release agent. If decryption key cannot be obtained for alpha numeric device, the alpha numeric device may not be decrypted and the process is terminated. Encoding module 330 may record the alpha numeric device was not decrypted and present the error to user through display of biometric device 110 or present information so that an operator may later check the alpha numeric device that was not decrypted to forge a possible solution.

At step 510, packeting module 325 may generate a data packet to be transmitted to institution 125. The data packet may comprise alpha numeric device and one or more identifying operational tags. Operational tags may include the information identifying electronic transaction of user. Operational tags may include a timestamp taken from the time of creation of the operational tag by packeting module 325. In some embodiments, time stamp may be embedded within the tag while in other embodiments timestamp may be independent of the tag. Operational tags may include a geographic stamp including city, state/province, country, time zone, Internet Service Provider, net speed, or the network type taken from the location of biometric device 110 wherein some embodiments institution 125 may compare the geographic information with user 105's self-entered geographic information for consistency. In other embodiments, institution 125 may not require operational tag or packeting module 325 may not generate an operational tag during the packing process.

Redundancy module 335 may then apply a redundancy check on alpha numeric device. For verification while decryption while packet is being generated, alpha numeric device received during authentication session may be compared to alpha numeric device derived from the enrollment process of user 105 into biometric authentication system 100. Upon the result of the comparison, when decryption inputted alpha numeric device is within a predetermined threshold such as but not limited to, equal or 99% equivalent, to the alpha numeric derived from the enrollment process such that there is a match between inputted alpha numeric device and the alpha numeric derived from the enrollment process, the redundancy check is confirmed and the packet is transmitted to institution 125. Alpha numeric device may also be converted back into a biometric hash string where it is then once again compared to the biometric hash string associated with user 105 during enrollment session. The entire process may also be done in reverse for a further redundancy check to confirm the validity of the alpha numeric device.

At step 511, packet then may be sent to institution 125, which may then collect any user 105 or biometric device 110 information device during enrollment. Institution 125 may store some or all of the alpha numeric device as well as any additional tags that have been received by server 120. In some embodiments, institution 125 may further generate a device identifier in addition to the alpha numeric device that identifies each user. Using the alpha numeric device institution 125 may also detect fraudulent activities during the enrollment process.

Redundancy module 335 may then apply a redundancy check on alpha numeric device. For verification while decryption while packet is being transmitted to institution, alpha numeric device received during authentication session may be compared to alpha numeric device derived from the enrollment process of user 105 into biometric authentication system 100. Upon the result of the comparison, when decryption inputted alpha numeric device is within a predetermined threshold such as but not limited to, equal or 99% equivalent, to the alpha numeric derived from the enrollment process such that there is a match between inputted alpha numeric device and the alpha numeric derived from the enrollment process therefore, the redundancy check is confirmed and the packet is transmitted to institution 125. Alpha numeric device may also be converted back into a biometric hash string where it is then once again compared to the biometric hash string associated with user 105 during enrollment session. The entire process may also be done in reverse for a further redundancy check to confirm the validity of the alpha numeric device.

At step 512, packet may be encrypted. At step 513, batching module 320 may access the encrypted packets and form or more batches containing the alpha numeric devices and store in database institution 125. Alpha numeric devices may be assigned to batches according to one or more defined connections so that packets associated with the same connection may be assigned to the same batch. The connection may be pre-defined or they may be defined based on the received alpha numeric devices. Accordingly, batching module 320 may determine that a received biometric alpha numeric is associated with a defined connection.

Batching module 320 may process each of the received alpha numeric devices into a batch of data packets associated with the same defined connection as the received alpha numeric device. This allows received alpha numeric devices belonging to the same connection to be configured into the same batch and further operations may be performed to batches of packets rather than single biometric hash strings.

At step 514, packet may be decrypted. At step 515, for each packet in the batch, the alpha numeric device may be unpacketed and the decrypted alpha numeric device may act as a private key used for identity authentication for any associated account numbers of user 110. In other embodiments, the alpha numeric device may act as identify authentication for a password, credit card, a bitcoin wallet, an encryption key for storage of certain data, an encryption key for permission to view sensitive information, and/or any other private or sensitive information sought to be protected or validated that is associated with user.

Institution 125 responds to receipt of user 105's alpha numeric device by storing the numeric device as a record in a master key database within one or more. If multiple biometric hash strings were created from a biometric sample, the identifiers for the family of biometric hash strings may be identified and recombined together or individually validated. Institution 125 may acknowledge receipt of user's 105 account association with biometric sample by transmitting the confirmation to user 105 through biometric device 110, or other methods such as through an application, email, or text. At step 515, institution 125 may then determine if the account of user 105 is valid and on active status and then confirm the account of user 105 whereby user 105 may then be granted any privileges that are granted by a successful verification of biometric sample such as authentication or further instructions.

In one or more non-limiting embodiments user 105 may be inputting a biometric sample to authorize payment to purchase goods from a merchant through biometric authentication system 100. A merchant is any entity that sells goods or services and maintains a merchant account that enables them to accept payment collected through the authentication biometric samples as payment from user for goods or services provided. In one non-limiting embodiment, the merchant may send a prenote of $0 value to verify biometric sample and account information provided by user 105. Once account has been verified the appropriate rules are checked and applied and the availability of funds is determined from the account of user 105. If there are insufficient funds, a rejection may occur wherein the rejection transaction is logged with institution database and the user 105 may be presented with the rejection notice through display 270 of biometric device 110 or some other device or notification system.

If authorized pursuant to their agreement previously agreed upon by user 105 and institution 125, institution 125 may then charge the electronic payments against user's 105 account, such as, without limitation thereto, user 105's checking account, savings account, credit card, or debit card. Similarly, institution 125 may credit a merchant's checking account, savings account or credit account for electronic payment. Institution 125 may also be an internal corporate organization responsible for accounting for units that may be without monetary value such as membership credits.

The accepting or rejection response may be generated as a normalized message at and transmitted back to display 270 of biometric device 110 for user 105 to see. A response code may reach the merchant's terminal, software or gateway, and be stored in one or more batches awaiting settlement, whereby biometric authentication system 100 allows a merchant to initiate the settlement process by transmitting their batch of approved authorizations to institution 125 wherein authorization batches are transmitted at predetermined intervals such as the end of every business day of the merchant.

Upon successful authentication of a biometric sample of user 105 and successful authorization by institution 125, a page may be presented on biometric device 110. The page presented may display that biometric authentication system 100 has confirmed the biometric sample has been converted to a biometric hash string and then to an alpha numeric device where the alpha numeric device was then received by institution 125 providing authorization or further instructions. In one or more non-limiting embodiments, biometric authentication system 100 may automatically remove funds from user 105's account (e.g. such as for garnishments from a court ruling).

In one or more non-limiting embodiments, user 105 may be inputting a biometric sample for identification purposes such as when a police offer has pulled user 105 over on the side of the road. Once the account has been verified, the appropriate rules are checked and applied identification of user 105 may be determined. Upon successful authentication of a biometric sample of user 105 and successful authorization by institution 125, a page may be presented by display 270 of biometric device 110. The page presented may display that biometric authentication system 100 has confirmed the biometric sample has been converted to a biometric hash string and then alpha numeric device where it was then received by institution 125 providing identification and further instructions to the officer. The additional instructions may come from a law enforcement program or database that has been integrated into biometric authentication system 100

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A biometric authorization system, comprising:
   one or more databases coupled via a network;
   one or more processors coupled to the one or more databases; and
   at least one computing device coupled to the one or more processors and the one or more databases via the network; wherein the one or more processors are configured to:
   extracting one or more features of a first biometric sample corresponding to a body of a user;
   encoding the features of the first biometric sample as a first biometric hash string;

verifying the first biometric hash string is equal to a previously inputted biometric hash string, wherein the previously inputted biometric hash string equates with the identity of the user;

converting the first biometric hash string into a first alpha numeric device, wherein the first alpha numeric device is configured to act as an authorization code for authenticating an identity by an institution;

comparing the first biometric hash string and the first alpha numeric device to a second biometric hash string and a second alpha numeric device created by a parallel cyclic check wherein the first alpha numeric device or the first biometric hash string are fed back through the biometric authorization system; and generating a packet configured for transmission to at least one institution, the packet comprising the alpha numeric device.

2. The biometric authorization system of claim 1, the one or more processors further configured to:

encrypting and decrypting the first biometric hash strings;

storing the first biometric hash strings into batches corresponding to each identified connection;

encrypting and decrypting the alpha numeric devices; and storing the encrypted alpha numeric devices into batches corresponding to each identified connection.

3. The biometric authorization system of claim 2, the authorization process including:

associating an end-user account with an account number received; wherein the alpha numeric device is configured to operate as private key used for a created association with an identity authentication for the associated account number of the user for the institution.

4. The biometric authorization system of claim 3, the authorization process including:

storing the received encrypted alpha numeric device at the institution in a batch corresponding with one or more identified connections wherein the packets associated with the same connection are assigned to the same batch.

5. The biometric authorization system of claim 4, wherein the packet further comprises one or more tags, wherein the tags have a timestamp of the time of creation of the first biological sample corresponding to the user.

6. The biometric authorization system of claim 5, the tags further comprising a geographic stamp indicating city, state/province, country, time zone, and internet service provider.

7. The biometric authorization system of claim 5, the authorization process including:

presenting, to the institution, geographic information of the geographic stamp with the user's inputted geographic information for comparison for validity.

8. The biometric authorization system of claim 5, the authorization process including:

storing the first alpha numeric device received at the institution as a record in a master key database associated with the user account; and validating the accessing of the institution by the user and to present confirmation to the user.

9. The biometric authorization system of claim 5, the authorization process including:

authorizing one or more payments to purchase goods from a merchant; and crediting the merchant's checking account, savings account, or credit account for electronic payment.

10. The biometric authorization system of claim 5, wherein the institution is an internal corporate organization responsible for accounting of membership units.

11. The biometric authorization system of claim 10, the authorization process including:

storing a response code for an authorization in one or more batches awaiting settlement; and initiating a settlement process by transmitting the one or more batches of approved authorizations to the institution wherein the one or more batches are transmitted at predetermined intervals.

12. The biometric authorization system of claim 5, wherein the biometric sample is converted into multiple biometric hash strings that are converted into multiple alpha numeric devices, the multiple biometric hash strings having one or more family identifiers, the multiple alpha numeric devices then recombined when received at the institution.

13. The biometric authorization system of claim 5, the authorization process including:

authorizing the alphanumeric device from the biometric sample for identification purposes for a police officer, wherein when the account of the user has been verified is presented to the police officer confirming identification; and presenting instructions to the officer, the instructions on a connected law enforcement database.

14. The biometric authorization system of claim 5, the alpha numeric device configured to operate as identity authentication for a password, a credit card, a bitcoin wallet, an encryption key for storage of certain data, and an encryption key for permission to view sensitive information.

15. The biometric authorization system of claim 5, the authorization process including:

encrypting and locally storing the first biometric hash strings on the computing device such that the biometric hash strings have another level of validation before being sent over the network; and combining the biometric hash strings with cryptographic random data stored on biometric device before transmitted over the network.

16. A computer implemented method for biometric authorization, the method comprising:

extracting one or more features of a first biometric sample corresponding to a body of a user by a biometric authorization system comprising one or more databases coupled via a network, one or more processors coupled to the one or more databases; and at least one computing device coupled to the one or more processors and the one or more databases via the network;

encoding, by the biometric authorization system, the features of the first biometric sample as a first biometric hash string;

verifying, by the biometric authorization system, the first biometric hash string matches a previously inputted biometric hash string, wherein the previously inputted biometric hash string equates with the identity of the user;

converting, by the biometric authorization system, the first biometric hash string into a first alpha numeric device, wherein the first alpha numeric device is configured to act as an authorization code for authenticating an identity by an institution;

comparing, by the biometric authorization system, the first biometric hash string and the first alpha numeric device to a second biometric hash string and a second alpha numeric device created by a cyclic check wherein the first alpha numeric device or the first biometric hash string are fed back through the biometric authorization system; and generating a packet configured for transmission to at least one institution, the packet comprising the alpha numeric device;

storing the received encrypted alpha numeric device at the institution in a batch corresponding with one or more identified connections wherein the packets associated with the same connection are assigned to the same batch.

17. The method of claim 16, further comprising encrypting and locally storing the biometric hash strings on the computing device such that the biometric hash strings have another level of validation before being sent over the network; and combining the biometric hash strings with cryptographic random data stored on the biometric device before transmitted over the network.

18. The method of claim 17, wherein the biometric sample is converted into multiple biometric hash strings that are converted into multiple alpha numeric devices, the multiple biometric hash strings having one or more family identifiers, the multiple alpha numeric devices then recombined when received at the institution.

19. The method of claim 18 further comprising:

associating an end-user account with an account number received; wherein the alpha numeric device is configured to operate as a private key used for a created association with an identity authentication for the associated account number of the user for the institution;

storing the first alpha numeric device received at the institution as a record in a master key database associated with the user account; and validating the accessing of the institution by the user and presenting confirmation to the user.

20. The method of claim 19, authorizing one or more payments to purchase goods from a merchant;

crediting the merchant's checking account, savings account or credit account for electronic payment;

storing a response code for an authorization in one or more batches awaiting settlement; and initiating a settlement process by transmitting the one or more batches of approved authorizations to institution wherein the one or more batches are transmitted at predetermined intervals.

\* \* \* \* \*